United States Patent
Lin

(10) Patent No.: US 10,887,920 B2
(45) Date of Patent: Jan. 5, 2021

(54) APPARATUSES AND METHODS FOR BANDWIDTH PART (BWP) SELECTION FOR A RANDOM ACCESS PROCEDURE

(71) Applicant: MEDIATEK INC., Hsin-Chu (TW)

(72) Inventor: Guan-Yu Lin, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 67 days.

(21) Appl. No.: 16/242,269

(22) Filed: Jan. 8, 2019

(65) Prior Publication Data

US 2019/0215869 A1 Jul. 11, 2019

Related U.S. Application Data

(60) Provisional application No. 62/631,264, filed on Feb. 15, 2018, provisional application No. 62/616,041, filed on Jan. 11, 2018.

(51) Int. Cl.
| | |
|---|---|
| *H04W 74/08* | (2009.01) |
| *H04W 72/04* | (2009.01) |
| *H04W 74/02* | (2009.01) |
| *H04W 76/11* | (2018.01) |

(52) U.S. Cl.
CPC ....... *H04W 74/0833* (2013.01); *H04W 74/02* (2013.01); *H04W 76/11* (2018.02); *H04W 72/0453* (2013.01)

(58) Field of Classification Search
CPC ..... H04L 5/001; H04L 5/0053; H04L 5/0098; H04W 74/02; H04W 76/11; H04W 74/0833; H04W 72/0453
See application file for complete search history.

(56) References Cited

U.S. PATENT DOCUMENTS

| | | | |
|---|---|---|---|
| 8,891,478 B2 | 11/2014 | Kakishima et al. | |
| 2018/0098361 A1* | 4/2018 | Ji | H04L 45/00 |
| 2019/0364602 A1* | 11/2019 | Yi | H04W 74/0833 |

FOREIGN PATENT DOCUMENTS

CN 103168442 A 6/2013

OTHER PUBLICATIONS

3GPP "3GPP TS 38.321 V15.0.0," Dec. 2017.*
Technical Specification Group Radio Access Network; 3rd Generation Partnership Project; Technical Specification Group Radio Access Network; NR; Medium Access Control (MAC) protocol specification (Release 15); Jan. 2018; pp. 1-55.
Offline discussion for BWP; 3GPP TSG-RAN WG2 Meeting #100; Dec. 2017; pp. 1-11.

* cited by examiner

*Primary Examiner* — Mark H Rinehart
*Assistant Examiner* — Kenneth P Hunt
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a service network. The controller selects one of one or more uplink (UL) Bandwidth Parts (BWPs) to be an active UL BWP, and selects one of one or more downlink (DL) BWPs to be an active DL BWP according to an association between the UL BWPs and the DL BWPs. Also, the controller performs a random access procedure on the active UL BWP and the active DL BWP via the wireless transceiver.

14 Claims, 6 Drawing Sheets

APPARATUSES AND METHODS FOR BANDWIDTH PART (BWP) SELECTION FOR A RANDOM ACCESS PROCEDURE

CROSS REFERENCE TO RELATED APPLICATIONS

This Application claims priority of U.S. Provisional Application No. 62/616,041, filed on Jan. 11, 2018, the entirety of which is incorporated by reference herein. This Applications also claims priority of U.S. Provisional Application No. 62/631,264, filed on Feb. 15, 2018, the entirety of which is incorporated by reference herein.

BACKGROUND OF THE APPLICATION

Field of the Application

The application generally relates to random access procedures and, more particularly, to apparatuses and methods for Bandwidth Part (BWP) selection for a random access procedure.

Description of the Related Art

With the growing demand for ubiquitous computing and networking, various cellular technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These multiple cellular technologies have been adopted in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, improving services, and making use of a new spectrum, and to better integrate with other open standards using OFDMA with a cyclic prefix (CP) on the downlink (DL) and on the uplink (UL), as well as to support beamforming, Multiple-Input Multiple-Output (MIMO) antenna technology, and carrier aggregation.

In 5G NR, different User Equipment (UEs) may be configured with different uplink (UL) and downlink (DL) resources (e.g., Bandwidth Parts (BWPs) or Physical Random Access Channel (PRACH) occasions) for data transmissions and receptions. That is, during random access procedures, the resources used by different UEs for sending random access preambles and receiving random access responses may be different. Consequently, ambiguity may occur during random access procedures for both the network side and the UE side.

FIG. 1A is a schematic diagram illustrating the DL BWP ambiguity during a contention-based random access procedure. As shown in FIG. 1A, several UEs may be operated on separate DL BWPs and the same UL BWP. When the network receives a random access preamble on this UL BWP, it cannot identify which UE sent this random access preamble since there are multiple UEs sharing the same UL BWP. As a result, the network cannot decide on which DL BWP the random access response should be sent.

FIG. 1B is a schematic diagram illustrating the UL BWP ambiguity during a contention-based random access procedure. As shown in FIG. 1B, several UEs may be operated on the same DL BWP and separate UL BWPs. When a UE receives a random access response from the network, it cannot identify if this random access response is for itself or for another UE which is operated on another UL BWP. As a result, indeterminate UE behaviors may occur.

BRIEF SUMMARY OF THE APPLICATION

In order to solve the ambiguity problems, the present application proposes apparatuses and methods for BWP selection for a random access procedure, in which associated UL and DL BWPs are selected to be the active UL and DL BWPs for performing the random access procedure.

In one aspect of the application, a UE comprising a wireless transceiver and a controller is provided. The wireless transceiver is configured to perform wireless transmission and reception to and from a service network. The controller is configured to select one of one or more UL BWPs to be an active UL BWP, select one of one or more DL BWPs to be an active DL BWP according to an association between the UL BWPs and the DL BWPs, and perform a random access procedure on the active UL BWP and the active DL BWP via the wireless transceiver.

In another aspect of the application, a method for BWP selection for a random access procedure, executed by a UE wirelessly connected to a service network, is provided. The method for BWP selection for a random access procedure comprises the steps of: selecting one of one or more UL BWPs to be an active UL BWP; selecting one of one or more DL BWPs to be an active DL BWP according to an association between the UL BWPs and the DL BWPs; and performing a random access procedure on the active UL BWP and the active DL BWP.

Other aspects and features of the present application will become apparent to those with ordinarily skill in the art upon review of the following descriptions of specific embodiments of the UEs and the methods for BWP selection for a random access procedure.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
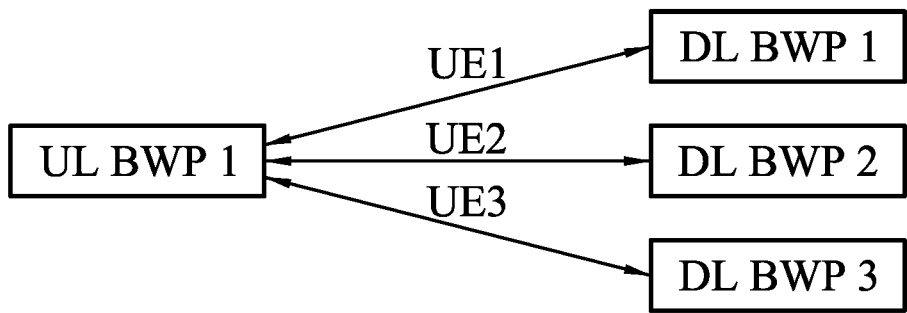
FIG. 1A is a schematic diagram illustrating the DL BWP ambiguity during a contention-based random access procedure.
Figure 1B:
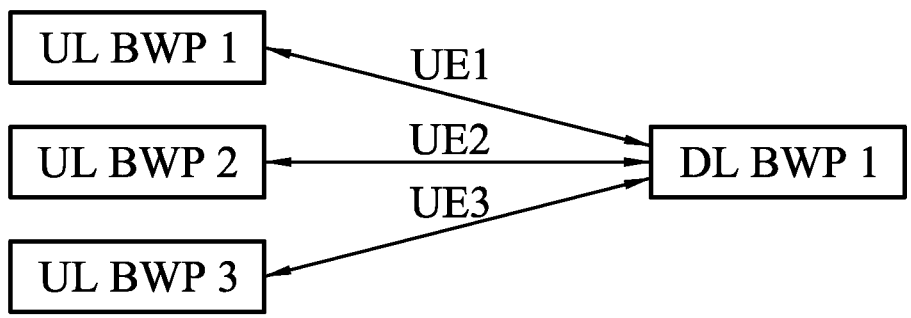
FIG. 1B is a schematic diagram illustrating the UL BWP ambiguity during a contention-based random access procedure.
Figure 2:
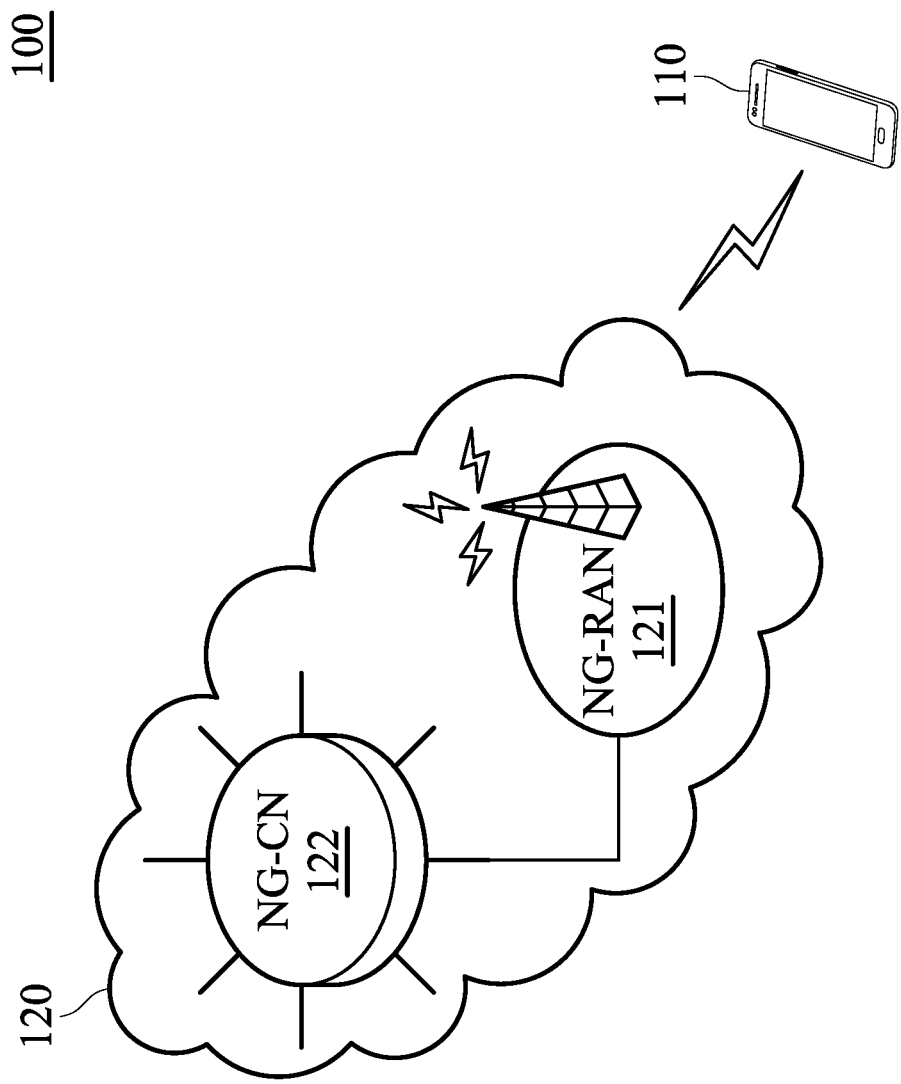
FIG. 2 is a block diagram of a wireless communication environment according to an embodiment of the application.

FIG. 2 is a block diagram of a wireless communication environment according to an embodiment of the application.

As shown in FIG. 2, the wireless communication environment 100 includes a User Equipment (UE) 110 and a 5G NR network 120, wherein the UE 110 may be wirelessly connected to the 5G NR network 120 for obtaining mobile services through random access procedures.

The UE 110 may be a feature phone, a smartphone, a panel Personal Computer (PC), a laptop computer, or any wireless communication device supporting the cellular technology (i.e., the 5G NR technology) utilized by the 5G NR network 120. Particularly, the UE 110 may support the beamforming technique for wireless transmission and/or reception.

The 5G NR network 120 may include a Next Generation Radio Access Network (NG-RAN) 121 and a Next Generation Core Network (NG-CN) 122.

The NG-RAN 121 may be responsible for processing radio signals, terminating radio protocols, and connecting the UE 110 with the NG-CN 122. The NG-RAN 121 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. The UE 110 may camp on one or more cells formed by one or more gNBs or TRPs, wherein the cell(s) which the UE 110 is camped on may include a Primary Cell (PCell) and/or a Primary Secondary Cell (PSCell), and one or more SCells.

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF may provide UE-based authentication, authorization, mobility management, etc. The SMF may be responsible for session management and allocates Internet Protocol (IP) addresses to UEs, and it may also select and control the UPF for data transfer. If a UE has multiple sessions, different SMFs may be allocated to each session to manage them individually and possibly provide different functions per session. The AF may provide information on the packet flow to PCF responsible for policy control in order to support Quality of Service (QoS). Based on the information, the PCF may determine policies about mobility and session management to make the AMF and the SMF operate properly. The AUSF may store data for authentication of UEs, while the UDM may store subscription data of UEs.

It should be noted that the 5G NR network 120 depicted in FIG. 2 is for illustrative purposes only and is not intended to limit the scope of the application. The application could be applied to other cellular technologies, such as a future enhancement of the 5G NR technology.

Figure 3:
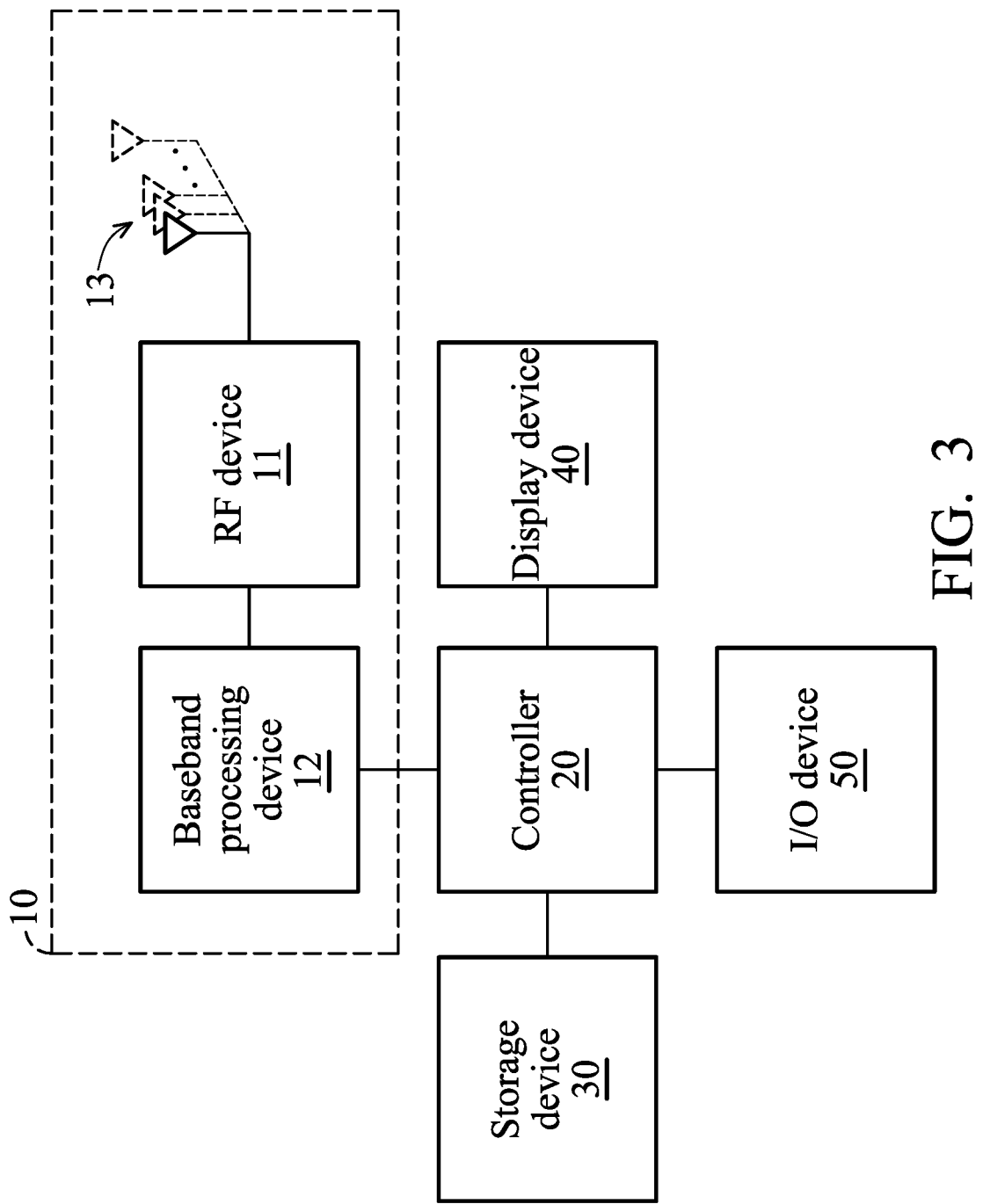
FIG. 3 is a block diagram illustrating a UE according to an embodiment of the application.

FIG. 3 is a block diagram illustrating a UE according to an embodiment of the application.

A UE may include a wireless transceiver 10, a controller 20, a storage device 30, a display device 40, and an Input/Output (I/O) device 50.

The wireless transceiver 10 may be configured to perform wireless transmission and reception to and from the NG-RAN 121. Specifically, the wireless transceiver 10 may include a Radio Frequency (RF) device 11, a baseband processing device 12, and antenna(s) 13, wherein the antenna(s) 13 may include one or more antennas for beamforming. The baseband processing device 12 may be configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or another radio frequency, depending on the cellular technology in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the 5G NR network 120, storing and retrieving data (e.g., program code) to and from the storage device 30, sending a series of frame data (e.g. representing text messages, graphics, images, etc.) to the display device 40, and receiving and sending signals from and to the I/O device 50. In particular, the controller 20 may coordinate the aforementioned operations of the wireless transceiver 10, the storage device 30, the display device 40, and the I/O device 50 for performing the method for BWP selection for a random access procedure.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocol(s) (e.g., the communication protocol used for communicating with the 5G NR network 120), and/or the method for BWP selection for a random access procedure.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the application. For example, a UE may include more components, such as a power supply, or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, a UE may not include the display device 40 and/or the I/O device 50.

Figure 4:
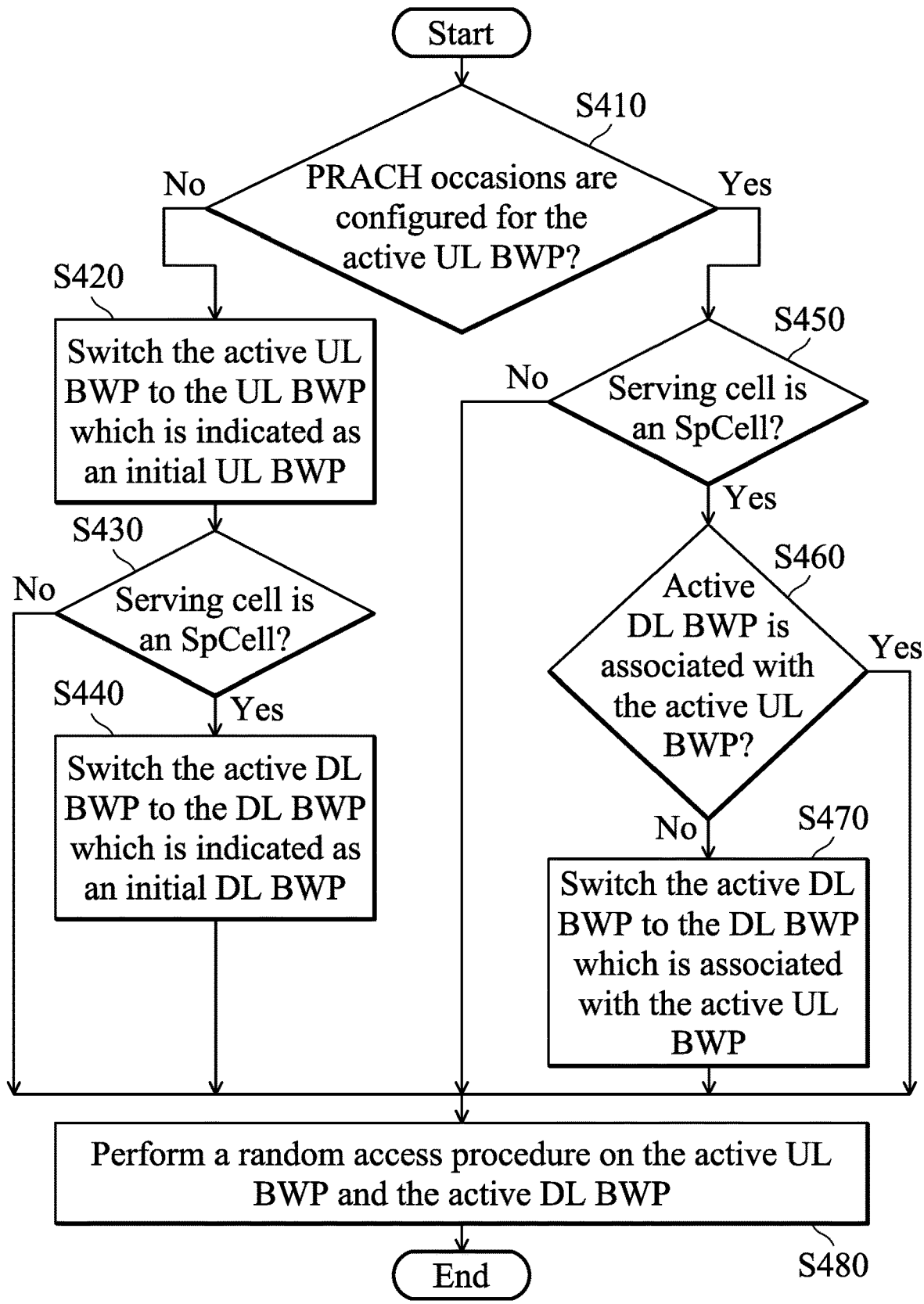
FIG. 4 is a flow chart illustrating the method for BWP selection for a random access procedure according to an embodiment of the application.

FIG. 4 is a flow chart illustrating the method for BWP selection for a random access procedure according to an embodiment of the application.

In this embodiment, the method for BWP selection for a random access procedure may be executed by a UE (e.g., the UE 110) wirelessly connected to a service network (e.g., the 5G NR network 120). Specifically, the random access procedure may be a contention-based random access procedure, but the present application should not be limited thereto. That is, the method of the present application may also be applied to a contention-free random access procedure.

To begin with, the UE determines whether Physical Random Access Channel (PRACH) occasions are configured for the active UL BWP (step S410).

In one embodiment, the UE may be configured with one or more uplink (UL) and downlink (DL) resources (e.g., Bandwidth Parts (BWPs) and/or PRACH occasions) for data transmissions and receptions to and from the 5G NR network 120.

Specifically, a BWP may refer to a contiguous set of Physical Resource Blocks (PRBs) on a given frequency carrier, and a PRACH occasion may refer to a time-frequency resource on which a PRACH message 1 (i.e., a random access preamble) is transmitted using the configured PRACH preamble format with a single particular Transmission (TX) beam. For example, if an UL BWP is configured with PRACH occasions, then the frequency range of each PRACH occasion is a subset of this UL BWP.

Subsequent to step S410, if PRACH occasions are not configured for the active UL BWP, the UE switches the active UL BWP to the UL BWP which is indicated as an initial UL BWP configured by the service network (step S420).

Specifically, the initial UL BWP may refer to the UL BWP used for initial access, and it may be configured through a parameter "initialUplinkBWP" which is received in a system information broadcast (e.g., System Information Block (SIB)-1) from the service network and comprises the configuration for the initial UL BWP.

Subsequent to step S420, the UE determines whether the serving cell is a Special primary Cell (SpCell) (step S430).

Specifically, an SpCell refers to a Primary Cell (PCell) of a Mater Cell Group (MCG) or a Primary Secondary Cell (PSCell) of a Secondary Cell Group (SCG), and according to the 3GPP Technical Specification (TS) 38.321, release 15, contention-based random access procedures may only be initiated on SpCell and the ambiguity problems may occur in contention-based random access procedures. In other word, if the serving cell is an SpCell, the method of the present application may be applied to solve the ambiguity problem.

Please note that the 3GPP specification mentioned herein is used to teach the spirit of the application, and the application should not be limited thereto.

Subsequent to step S430, if the serving cell is an SpCell, the UE switches the active DL BWP to the DL BWP which is indicated as an initial DL BWP configured by the service network (step S440).

Specifically, the initial DL BWP may refer to the DL BWP used for initial access, and it may be configured through a parameter "initialDownlinkBWP" which is received in a system information broadcast (e.g., SIB-1) from the service network and comprises the configuration for the initial DL BWP.

Subsequent to step S410, if PRACH occasions are configured for the active UL BWP, the UE determines whether the serving cell is an SpCell (step S450). If the serving cell is an SpCell, the UE determines whether the active DL BWP is associated with the active UL BWP according to an association between the UL BWPs and the DL BWPs configured for the UE (step S460).

In one embodiment, the association between the UL BWPs and the DL BWPs indicates that UL BWP and DL BWP with the same BWP ID are associated with each other, and each BWP ID is uniquely configured for a respective UL BWP and a respective DL BWP. The association between the UL BWPs and the DL BWPs may be predetermined and known to both the UE and the service network, or may be signaled to the UE from the service network.

In step S460, the determination of whether the active DL BWP is associated with the active UL BWP may be performed by checking if the active DL BWP has the same BWP ID as the active UL BWP. If the active DL BWP has the same BWP ID as the active UL BWP, it may be determined that the active DL BWP is associated with the active UL BWP. Otherwise, if the active DL BWP does not have the same BWP ID as the active UL BWP, it may be determined that the active DL BWP is not associated with the active UL BWP.

Subsequent to step S460, if the active DL BWP is not associated with the active UL BWP, the UE switches the active DL BWP to the DL BWP which is associated with the active UL BWP (step S470). That is, the UE switches the active DL BWP to the DL BWP with the same BWP ID as the active UL BWP.

Subsequent to steps S440 and S470, the UE performs a random access procedure on the active UL BWP and the active DL BWP (step S480), and the method ends.

Specifically, in step S480, the UE may send a random access preamble on the active UL BWP to the service network, and receive a random access response on the active DL BWP from the service network. Please note that, since associated UL and DL BWPs are selected as the active UL and DL BWPs for performing the random access procedure, the ambiguity problems occurred in the random access procedure may be avoided.

Subsequent to steps S430 and S450, if the serving cell is not an SpCell, the method proceeds to step S480, and the method ends. That is, if the serving cell is not an SpCell, the random access procedure may be a contention-free random access procedure, and ambiguity problems may not occur in the contention-free random access procedure, so there's no need to switch the active DL BWP.

Subsequent to step S460, if the active DL BWP is associated with the active UL BWP, the method proceeds to step S480, and the method ends. That is, there's no need to switch the active DL BWP since the active DL BWP is already associated with the active UL BWP.

Figure 5A:
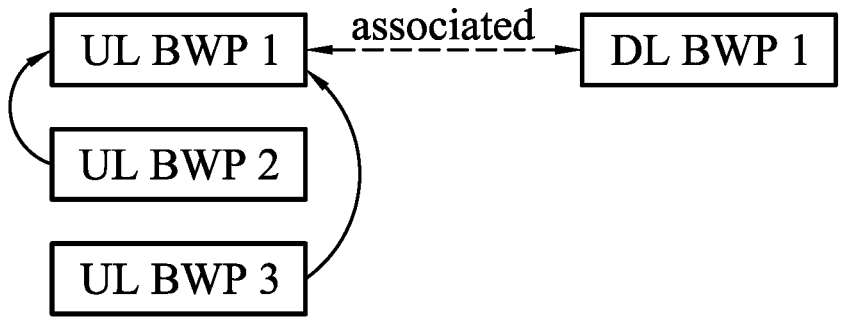
FIG. 5A is a schematic diagram illustrating BWP selection for a random access procedure according to an embodiment of the application.

FIG. 5A is a schematic diagram illustrating BWP selection for a random access procedure according to an embodiment of the application.

As shown in FIG. 5A, when the UE initiates a random access procedure (e.g., a contention-based random access procedure), the active UL BWP is UL BWP 2 or UL BWP 3 for which PRACH occasions are not configured, and the active DL BWP is DL BWP 1. Since PRACH occasions are not configured for the active UL BWP, the UE switches the active UL BWP from UL BWP 2/3 to the initial UL BWP, i.e., UL BWP 1, while keeping DL BWP 1 as the active DL BWP due to DL BWP 1 already being the initial DL BWP.

Please note that the UL BWP and the DL BWP with the same BWP ID are determined to be associated with each other according to the association between UL BWPs and DL BWPs.

Figure 5B:
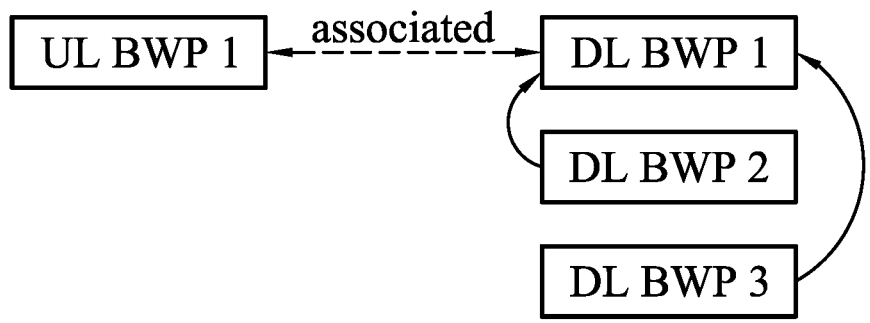
FIG. 5B is a schematic diagram illustrating BWP selection for a random access procedure according to another embodiment of the application.

FIG. 5B is a schematic diagram illustrating BWP selection for a random access procedure according to another embodiment of the application.

As shown in FIG. 5B, when the UE initiates a random access procedure (e.g., a contention-based random access procedure), the active UL BWP is UL BWP 1 for which PRACH occasions are configured, and the active DL BWP is DL BWP 2 or DL BWP 3. Since PRACH occasions are configured for the active UL BWP, the UE keeps UL BWP 1 as the active UL BWP, and switches the active DL BWP from DL BWP 2/3 to the DL BWP associated with the active UL BWP. That is, the UE switches the active DL BWP from DL BWP 2/3 to DL BWP 1 which has the same BWP ID as the active UL BWP.

Figure 5C:
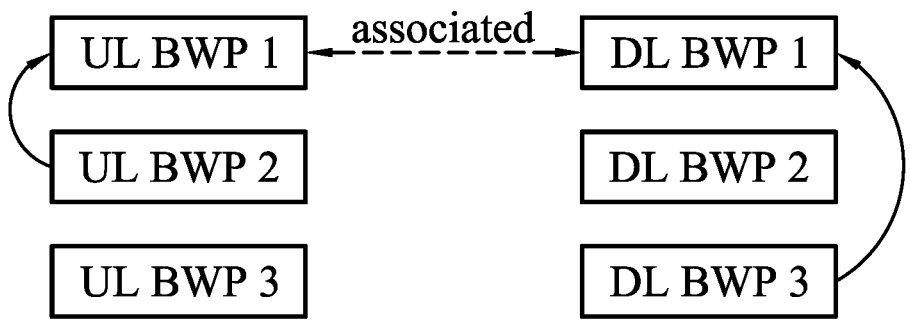
FIG. 5C is a schematic diagram illustrating BWP selection for a random access procedure according to another embodiment of the application.

FIG. 5C is a schematic diagram illustrating BWP selection for a random access procedure according to another embodiment of the application.

As shown in FIG. 5C, when the UE initiates a random access procedure (e.g., a contention-based random access procedure), the active UL BWP is UL BWP 2 for which PRACH occasions are not configured, and the active DL BWP is DL BWP 3. Since PRACH occasions are not configured for the active UL BWP, the UE switches the active UL BWP from UL BWP 2 to the initial UL BWP, i.e., UL BWP 1, and switches the active DL BWP from DL BWP 3 to the initial DL BWP, i.e., DL BWP 1.

Please note that the UL BWP and the DL BWP with the same BWP ID may be determined to be associated with each other according to the association between UL BWPs and DL BWPs.

In another embodiment, each UL BWP may include a plurality of PRACH occasions configured for the UE to send the random access preamble, and each DL BWP may include a plurality of downlink resources or common search spaces or common control channels for the UE to receive the random access response. A downlink resource or a common search space or a common control channel may refer to a time-frequency resource which can be used for receiving a message 2 (i.e., Msg2, a random access response) of a RACH procedure. Moreover, there may be an association between the PRACH occasions in the UL BWPs and the downlink resources/common search spaces/common control channels in the DL BWPs, wherein the association may be one-on-one, one-to-many, or many-to-one correspondence. After selecting the active UL BWP and the active DL BWP, the UE may further select one of the PRACH occasions in the active UL BWP for sending the random access preamble, and select one of the downlink resources/common search spaces/common control channels in the active DL BWP, which is associated with the selected PRACH occasion in the active UL BWP, for receiving the random access response.

Figure 6:
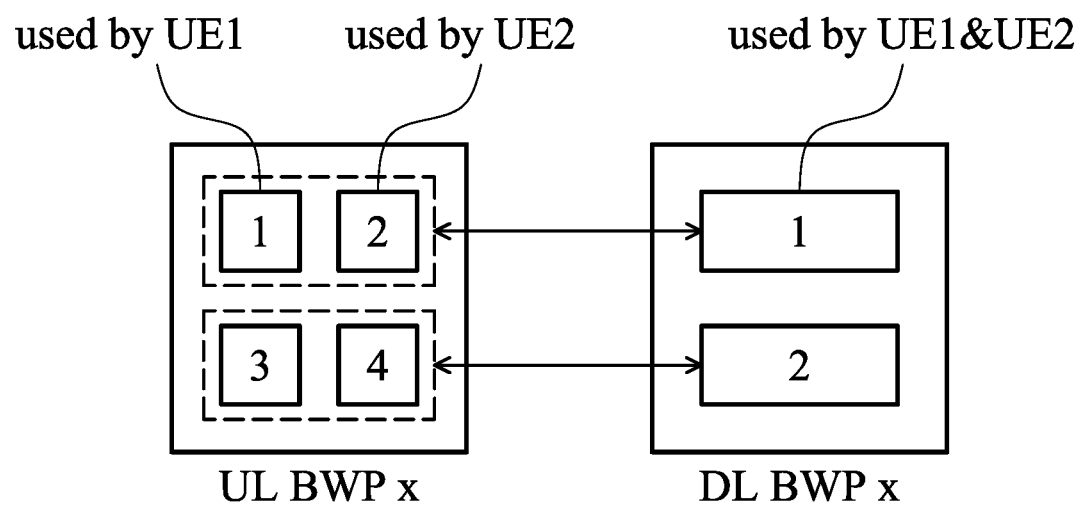
FIG. 6 is a schematic diagram illustrating an exemplary association between the PRACH occasions in the active UL BWP and the PRACH occasions in the active DL BWP.

FIG. 6 is a schematic diagram illustrating an exemplary association between the PRACH occasions in the active UL BWP and the PRACH occasions in the active DL BWP.

As shown in FIG. 6, both UE 1 and UE 2 apply UL BWP x and DL BWP x as the active UL BWP and the active DL BWP, respectively, wherein UL BWP x and DL BWP x have the same BWP ID x, and x denotes any BWP ID (e.g., 1). The active UL BWP includes four PRACH occasions (denoted with the number 1 to 4) for sending random access preambles, and the active DL BWP includes two separate DL resources for receiving random access responses (denoted with the number 1 and 2), wherein every two PRACH occasions in the active UL BWP are associated with a respective DL resource in the active DL BWP.

In this embodiment, if UE 1 uses PRACH occasion 1 to send a random access preamble to the service network, it may monitor on DL resource 1 for receiving a random access response. Due to multiple PRACH occasions (i.e., PRACH occasions 1 and 2) in the active UL BWP being associated with DL resource 1 in the active DL BWP, the service network may include in the random access response the information indicating on which one of the PRACH occasions 1 and 2 the random access preamble was received, so that UE 1 may identify whether the random access response is for itself or for UE 2.

Likewise, if UE 2 uses PRACH occasion 2 to send a random access preamble to the service network, it may identify whether the random access response received on DL resource 1 is for itself or not according to the information included in the random access response.

In view of the forgoing embodiments, it will be appreciated that the present application prevents the ambiguity problems occurred in random access procedures, by selecting the associated UL and DL BWPs to be the active UL and DL BWPs for performing random access procedures.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
   a wireless transceiver, configured to perform wireless transmission and reception to and from a service network; and
   a controller, configured to select one of one or more uplink (UL) Bandwidth Parts (BWPs) to be an active UL BWP, select one of one or more downlink (DL) BWPs to be an active DL BWP according to an association between the UL BWPs and the DL BWPs, and perform a random access procedure on the active UL BWP and the active DL BWP via the wireless transceiver;
   wherein the selecting of one of the DL BWPs to be the active DL BWP comprises: switching the active DL BWP to one of the DL BWPs, which is associated with the active UL BWP according to the association between the UL BWPs and the DL BWPs, in response to PRACH occasions being configured for the active UL BWP and the active DL BWP not being associated with the active UL BWP.

2. The UE of claim 1, wherein the selecting of one of the UL BWPs to be the active UL BWP comprises:
   switching the active UL BWP to one of the UL BWPs, which is indicated as an initial UL BWP configured by the service network, in response to no Physical Random Access Channel (PRACH) occasions being configured for the active UL BWP.

3. The UE of claim 2, wherein the selecting of one of the DL BWPs to be the active DL BWP comprises:
   switching the active DL BWP to one of the DL BWPs, which is indicated as an initial DL BWP configured by the service network.

4. The UE of claim 1, wherein the association between the UL BWPs and the DL BWPs indicates that UL BWP and DL BWP with the same BWP ID are associated with each other, and each BWP ID is uniquely configured for a respective UL BWP and a respective DL BWP.

5. The UE of claim 1, wherein the active UL BWP comprises a plurality of PRACH occasions and the active DL BWP comprises a plurality of DL resources, and the controller is further configured to receive an association between the PRACH occasions and the DL resources from the service network via the wireless transceiver.

6. The UE of claim 5, wherein the performing of the random access procedure comprises:
   selecting one of the PRACH occasions for sending a random access preamble to the service network via the wireless transceiver; and
   selecting one of the DL resources, which is associated with the selected PRACH occasion according to the association between the PRACH occasions and the DL resources, for receiving a random access response from the service network via the wireless transceiver.

7. The UE of claim 6, wherein the random access response comprises information indicating on which one of the PRACH occasions the random access preamble was received by the service network, in response to more than one of the PRACH occasions being associated with the selected DL resource according to the association between the PRACH occasions and the DL resources.

8. A method for Bandwidth Part (BWP) selection for a random access procedure, executed by a UE wirelessly connected to a service network, comprising:
   selecting one of one or more uplink (UL) BWPs to be an active UL BWP;
   selecting one of one or more downlink (DL) BWPs to be an active DL BWP according to an association between the UL BWPs and the DL BWPs, wherein the selecting of one of the DL BWPs to be the active DL BWP comprises: switching the active DL BWP to one of the DL BWPs, which is associated with the active UL BWP according to the association between the UL BWPs and the DL BWPs, in response to PRACH occasions being configured for the active UL BWP and the active DL BWP not being associated with the active UL BWP; and
   performing a random access procedure on the active UL BWP and the active DL BWP.

9. The method of claim 8, wherein the selecting of one of the UL BWPs to be the active UL BWP comprises:
   switching the active UL BWP to one of the UL BWPs, which is indicated as an initial UL BWP configured by the service network, in response to no Physical Random Access Channel (PRACH) occasions being configured for the active UL BWP.

10. The method of claim 8, wherein the selecting of one of the UL BWPs to be the active UL BWP comprises:
    switching the active DL BWP to one of the DL BWPs, which is indicated as an initial DL BWP configured by the service network.

11. The method of claim 8, wherein the association between the UL BWPs and the DL BWPs indicates that UL BWP and DL BWP with the same BWP ID are associated with each other, and each BWP ID is uniquely configured for a respective UL BWP and a respective DL BWP.

12. The method of claim 8, wherein the active UL BWP comprises a plurality of PRACH occasions and the active DL BWP comprises a plurality of DL resources, and the method further comprises:
    receiving an association between the PRACH occasions and the DL resources from the service network.

13. The method of claim 12, wherein the performing of the random access procedure comprises:
    selecting one of the PRACH occasions for sending a random access preamble to the service network; and
    selecting one of the DL resources, which is associated with the selected PRACH occasion according to the association between the PRACH occasions and the DL resources, for receiving a random access response from the service network.

14. The method of claim 13, wherein the random access response comprises information indicating on which one of the PRACH occasions the random access preamble was received by the service network, in response to more than one of the PRACH occasions being associated with the selected DL resource according to the association between the PRACH occasions and the DL resources.

* * * * *